United States Patent [19]

Balmer

[11] Patent Number: 4,811,864
[45] Date of Patent: Mar. 14, 1989

[54] CLEANING ARRANGEMENT FOR A ROLLER METERING DEVICE

[76] Inventor: Charles Balmer, P.O. Box 34, Elie, Manitoba, Canada, R0H 0H0

[21] Appl. No.: 81,091

[22] Filed: Aug. 3, 1987

[51] Int. Cl.$^4$ .............................................. B65D 88/54
[52] U.S. Cl. .................................... 222/148; 222/220; 222/342
[58] Field of Search ............... 222/148, 216, 217, 220, 222/236, 238, 342, 346–350, 368, 410

[56] References Cited

U.S. PATENT DOCUMENTS

| | | | |
|---|---|---|---|
| 233,040 | 10/1880 | Spangler | 222/220 |
| 1,515,993 | 11/1924 | Beyer | 222/220 |
| 2,732,086 | 1/1956 | Schnyder | 222/342 X |
| 3,203,601 | 8/1965 | Carson | 222/342 X |
| 3,630,416 | 12/1971 | Weisselberg et al. | 222/350 X |
| 4,053,088 | 10/1977 | Grataloup | 222/312 |
| 4,264,023 | 4/1981 | Stocks et al. | 222/368 X |
| 4,307,822 | 12/1981 | Hardesty | 222/368 X |

FOREIGN PATENT DOCUMENTS 0140431 11/1980 Japan .................................. 222/220

Primary Examiner—Kevin P. Shaver
Attorney, Agent, or Firm—Adrian D. Battison; Stanley G. Ade

[57] ABSTRACT

A roller metering device comprises a roller, which has continuous elongate grooves longitudinally thereof spaced angularly around the periphery thereof, mounted in a hopper so that it grasps and forwards a volume of the particulate material within the hopper for each movement of a recess past a metering edge into a plurality of cups and venturis arranged along the length of the roller. A cleaning device for the roller is provided which is driven by the roller and comprises a plurality rods carried in angularly spaced arrangement around an axis of rotation of the cleaning device with each rod extending along the length of the roller. In one arrangement there are twelve recesses in the roller and six rods on the cleaning device with the cleaning device driven at a 2:1 ratio in speed relative to the roller. This causes each rod as it engages a respective one of the recesses to move forwardly relative to the recess and also to move into the recess to cause a wiping action of the rod along the surface of the recess.

1 Claim, 3 Drawing Sheets

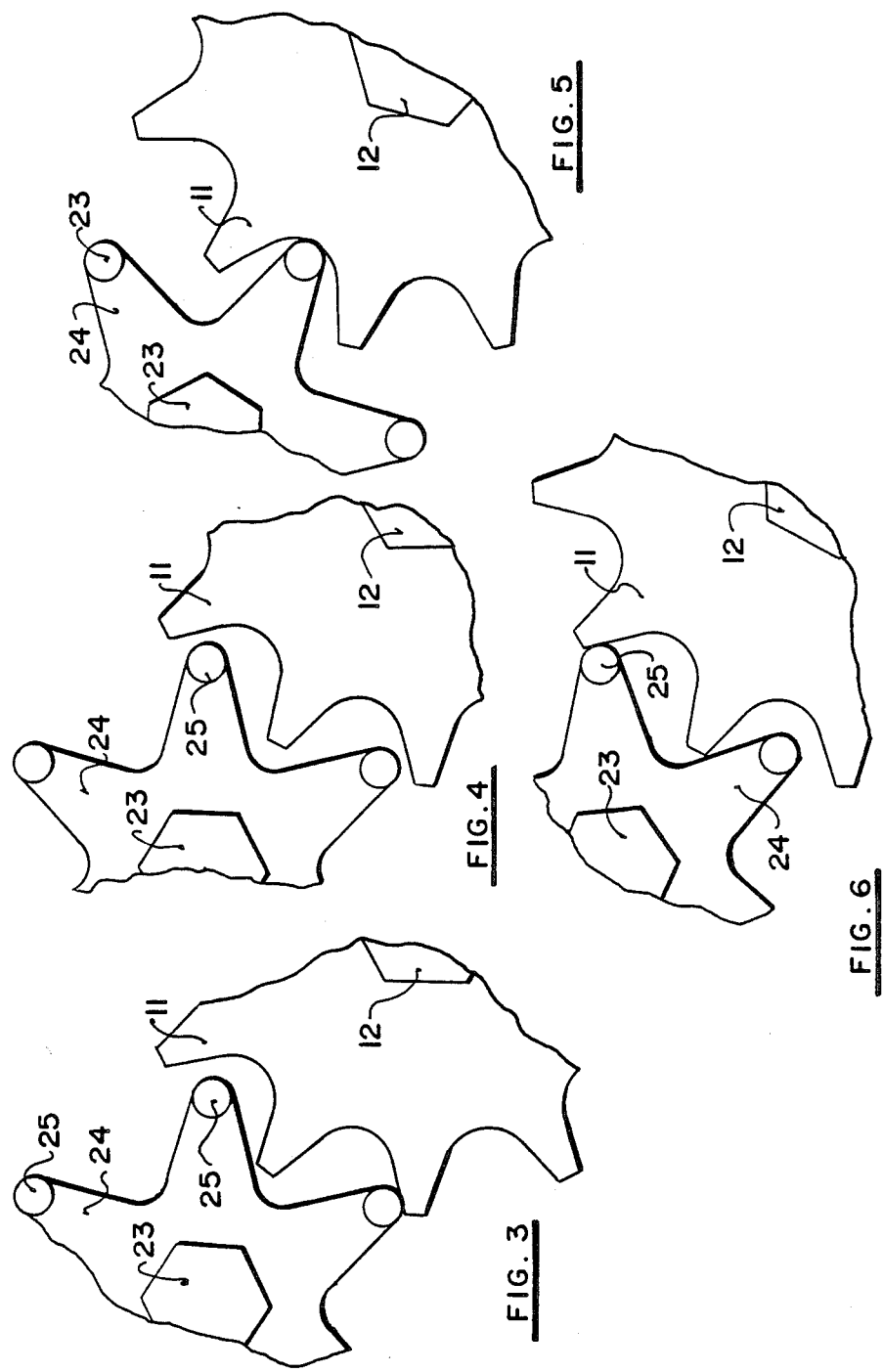

CLEANING ARRANGEMENT FOR A ROLLER METERING DEVICE

BACKGROUND OF THE INVENTION

This invention relates to apparatus for metering particulate material and particularly to a roller metering device of a type which includes a plurality of longitudinal grooves around the roller which grasp and carry the particulate material, and to a cleaning device for cleaning the grooves.

Roller metering arrangements have become used widely in devices for metering and spreading particulate material such as fertilizer, herbicides and the like. In arrangements of this type it is common for the roller to be positioned at the bottom of a hopper so that the roller feeds forwardly from the hopper a metered curtain of the material, the curtain falling into separate cups positioned along the length of the roller from which the material is pneumatically distributed to spreaders separated along the length of a boom. These devices have successfully operated on widely different materials and at widely varying distribution rates.

The metering roller, in order to achieve the most accurate metering, preferably includes a plurality of continuous grooves longitudinally along its length. With such continuous grooves, the material is accurately grasped and carried by the volume of the groove so that the metering rate is substantially constant regardless of changes in orientation of the roller caused by movement of the machine across uneven terrain or other variables.

While such rollers with continuous elongate grooves have been found to be most effective for accurate feeding, they have to date had a serious problem which has not been overcome until the development of the present invention. Specifically, when the particulate material to be metered contains any moisture or has any other adhesive properties, it tends to stick to the roller and hence gradually clogs the grooves and changes their dimensions thus interfering with the proper and accurate metering of the material. To date therefore this problem has effectively prevented the use of rollers of this type with the metering of particulate material which has such tendency to stick to the rollers.

Recent developments in the addition of liquid chemicals, for example herbicides, to particulate materials, for example fertilizer, have significantly increased the desirability for a device which can handle such particulate materials which are moist or have other adhesive properties.

It is appreciated that a single pass of equipment which spreads both the liquid chemical and the particulate material is much to be preferred.

Attempts have been made to solve the problems of cleaning action upon a roller metering system. In a first attempt, one example of which is illustrated in U.S. Pat. No. 4,053,088 (Nodet Gougis), the grooves in the roller are not continuous but are broken into separate pieces as defined by projecting fingers which extend outwardly from the roller and which engage and forward the particulate material. In between the fingers, a cleaning blade is presented which acts to scrape the roller on a constant diameter of the roller so that the fingers themselves are not cleaned. This technique tends to cause effective cleaning of the roller but unfortunately the discontinuous feeding mechanism defined by the individual fingers allows material to slip by the roller rather than to be positively fed by the roller and thus seriously reduces the accuracy of the feeding system.

Alternative techniques for attempting to clean the roller have used brushes which merely rotate about an axis parallel to the roller and include bristles which flex on each attempt to enter into the recesses defined by the grooves so the bristles flick in and out of the grooves and act to clean the grooves. In theory this technique is an effective technique in that it provides the continuous grooves required for accurate metering but in practice the constant flexing of the bristles necessary to move over the roller surface and to extend into the recesses causes the bristles to rapidly break down. This device has therefore received little commercial success.

SUMMARY OF THE INVENTION

It is one object of the present invention, therefore, to provide an improved roller metering device of this general type which includes a cleaning mechanism providing an effective cleaning of the roller while avoiding the constant flexure or reciprocation of the necessary cleaning parts.

According to the invention, therefore, it provides apparatus for metering particulate material comprising an elongate roller having a central axis of symmetry, a plurality of metering grooves formed in an outer peripheral surface of the roller, each groove extending longitudinally of the roller parallel to the roller axis and defining a substantially constant continuous cross-section along the roller which cross-section forms a smoothly curved cup-shaped surface recessed from said peripheral surface of the roller, said grooves being spaced angularly around said roller, means mounting the roller for rotation about said roller axis and adapted such that said particulate material in a container thereof can be engaged with said roller along the length of said grooves, drive means for rotating said roller at a desired speed such that each groove grasps and carries within its bounds a volume of said material, and means for cleaning said grooves of said roller as the roller rotates comprising a drive member rotatable about a longitudinal axis parallel to and spaced from the roller axis, a plurality of cleaning members carried by and projecting outwardly from said drive member in angularly spaced relation therearound, each of said cleaning members having a longitudinal extent not less than the length of the grooves, and synchronizing means for drivingly rotating the drive member at a rate synchronized with said desired speed of the roller, said synchronizing means being arranged to rotate said drive member at an angular velocity greater than that of the roller, the number of cleaning members being less than the number of grooves and arranged such that each groove as it rotates receives a cleaning member therein with the cleaning member rotating with the groove while the cleaning member moves relative to the groove to sweep around said curved surface of the groove.

Briefly, therefore, the mounting of the cleaning members and the number and speed of rotation relative to the roller causes each of the cleaning members to sweep over the surface of the groove as the cleaning member rotates relative to the groove while the groove itself rotates around the axis of the roller.

Preferably this is achieved by using simply a rigid series of rods arranged at the apex of a star shaped body having a number of cleaning members equal to one half the number of the grooves and with the rate of rotation of the cleaning members being twice that of the roller.

The cleaning member is therefore merely a simple rotating body with no relative movement of the parts thereof apart from the simple rotation of the body about its axis.

With the foregoing in view, and other advantages as will become apparent to those skilled in the art to which this invention relates as this specification proceeds, the invention is herein described by reference to the accompanying drawings forming a part thereof, which includes a description of the best mode known to the applicant and of the preferred typical embodiment of the principles of the present invention, in which:

DESCRIPTION OF THE DRAWINGS

FIGS. 3 to 6 show the inter-reacting parts only of the roller and cleaning device of FIGS. 1 and 2, showing them in a number of different positions as the parts rotate to provide the cleaning action.

In the drawings like characters of reference indicate corresponding parts in the different figures.

DETAILED DESCRIPTION

Figure 2:
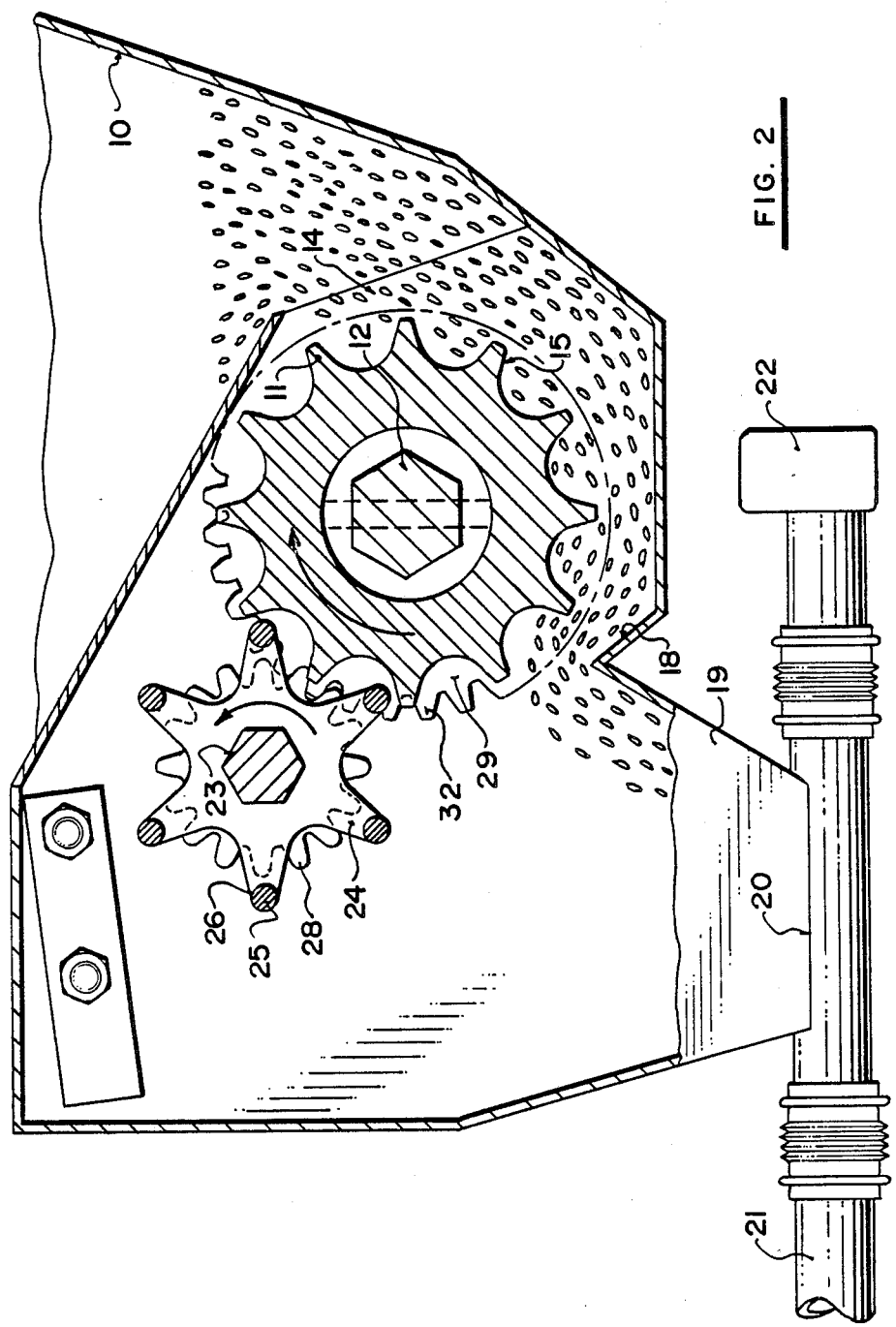
FIG. 2 is a cross-sectional view along the lines 2—2 of FIG. 1.

A known metering system comprises a hopper indicated in FIG. 2 by merely a rear hopper wall 10. Within the hopper and accessible by the particulate material within the hopper is mounted a metering roller 11 formed from a wear resistant plastics material and carried on a hexagonal shaft 12 for rotation about the longitudinal axis of the roller 11. The shaft 12 is mounted in a pair of bearings 13 carried in end plates 14 formed as a rigid interconnected structure so that the roller and end plates can be inserted into and removed from the hopper as required.

Figure 1:
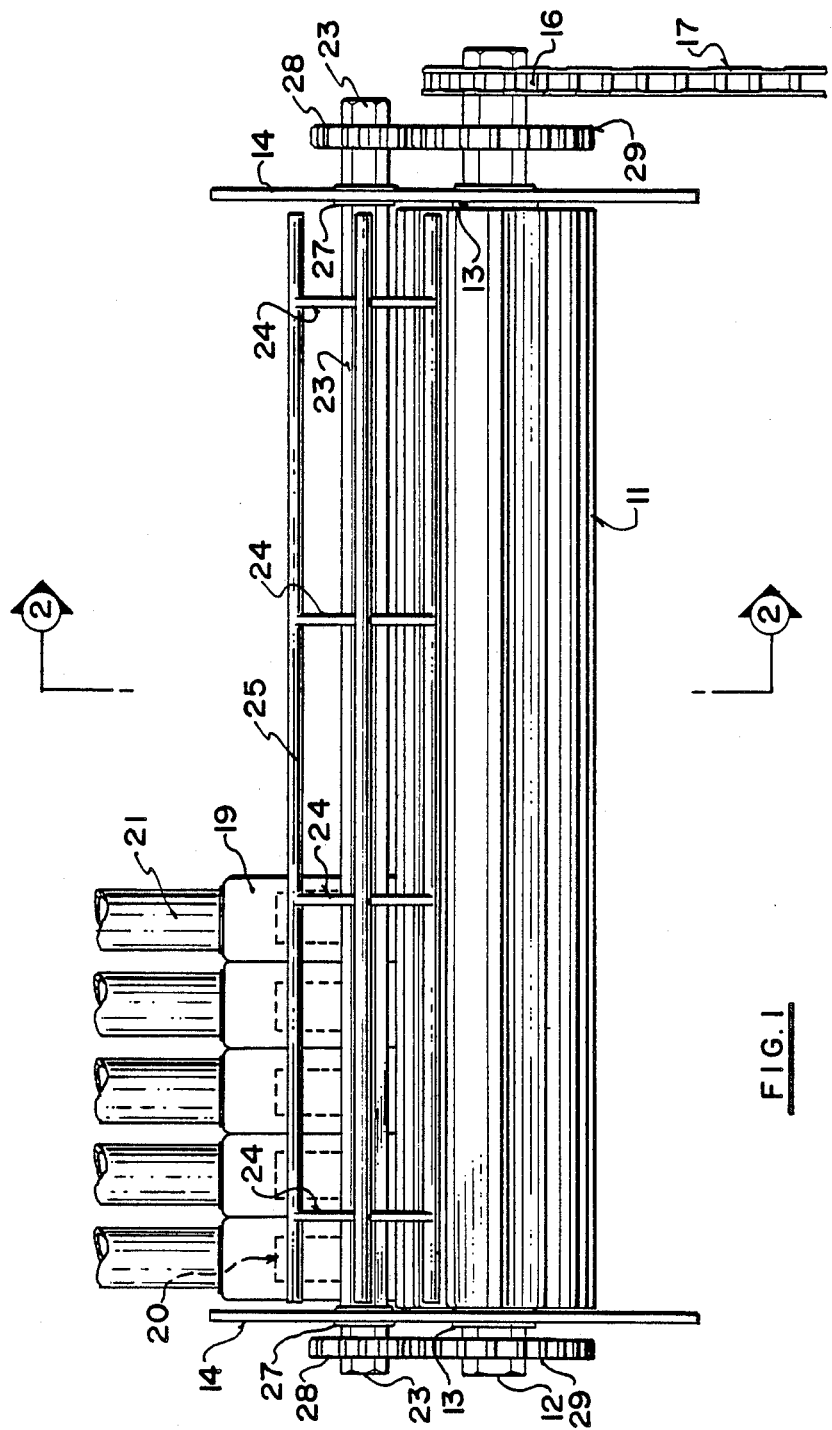
FIG. 1 is a top plan view of a roller metering system according to the invention incorporating a cleaning device for cleaning the grooves of the roller.

The roller includes around its periphery a plurality of recesses 15 which are continuous along the full length of the roller and are angularly spaced around the roller with each of the recesses being of identical shape and equally distantly spaced from the next adjacent recess. The roller is driven to rotate in a clockwise direction as shown in FIG. 2 by any suitable drive mechanism which is indicated in FIG. 1 for example as simply a sprocket 16 and a drive chain 17. As the roller rotates it grasps and carries the particulate material from the hopper up and over a restraining ridge 18 with the distance between the roller and the restraining ridge 18 being adjusted to provide an accurate feed of the material regardless of normal changes in orientation of the hopper and feed system about a horizontal axis parallel to the roller axis. The fine details of this metering control are not described herein as they are known to one skilled in the art. From metering ridge 18, the material fed drops into a cup 19 of a venturi 20. As shown in FIG. 1, there are a plurality of such cups 19 arranged side by side so they automatically divide the material fed from the roller into separate portions with each of the portions being effectively identical for feeding into a separate one of venturis. As it is well known the material from the venturi is distributed along a distribution duct 21 to suitable spreader nozzles arranged along the length of the boom with airflow for the movement being generated by a blower schematically indicated at 22.

The above device is a known device and has been found to operate satisfactorily and with accurate metering when used with widely different materials from relatively fine materials to coarse pellet like materials including fertilizer, granular herbicides and seeds and with widely differing feed rates obtained of course by varying the rate of rotation of the roller 11.

Problems arise however, when the material to be fed is almost and impregnated with liquid material or otherwise has some tendency to adhere to the surface of the roller. It will of course be appreciated that any material adhering to the surface of the roller will gradually fill the recesses 15 to differing amounts and hence will significantly interfere with the proper feed rate. Even when the roller is manufactured from relatively hard materials or materials with a low tendency to adhere to the particulate material to be distributed, the particles can attach to the roller and need to be removed therefrom.

There is therefore, provided in the embodiment shown a cleaning device generally indicated at 22 for cleaning the recesses of the roller as it rotates in its feeding action, the cleaning taking place continually.

The device 22 comprises a hexagonal shaft 23 which carries four star wheels 24 each of which is thin relative to the length of the shaft with the star wheels spaced longitudinally of the shaft so as to provide support for six rods 25. The star wheels 24 each provide six apexes with a cup 26 formed at each apex for receiving an inner facing edge of a cylindrical one of the rods 25. The rods 25 are thus spaced around the axis in equidistant spacing and are arranged parallel to the axis and running substantially wholly along the length of the shaft and to an extent equal to or slightly longer than the roller 11. The device 22 therefore presents on its outer most periphery the outer cylindrical surfaces of the rods 25 with the interior of the device being open between the rods and between the shaft to allow any material to fall there through.

The shaft 23 is mounted for rotation on bearings 27 carried in the end plates 14. Outside of the end plates 14, the shaft 23 carries a pair of gear wheels 28 each of which meshes with a respective gear wheel 29 carried on the shaft 12 of roller 11. Thus the cleaning device 22 is rotated by the intermeshing relationship between the space in an anticlockwise direction about a longitudinal axis of the shaft 23. The shaft 23 and 12 are both hexagonal in order to insure synchronizism of movement of the device 22 and the roller 11 in view of the relative close tolerances there between.

As shown in the embodiment specifically described, the number of recesses 15 on the roller 11 is twelve and the number of rods of the cleaning device 22 is six. In addition the number of teeth on the gear wheel 29 is thirty-two and the number of teeth on the gear wheel 28 is sixteen. Thus the gear wheel 28 and the cleaning device 22 rotate at an angular velocity twice that of the roller 11. The diameter of the gear wheel 28 is however slightly greater than half that of the gear wheel 29. These numbers and dimensions are of course exemplary only and the dimensions and numbers can be selected to obtain the specific result which is described hereinafter.

Referring therefore to the sequential steps illustrated in FIGS. 3, 4, 5 and 6, it will be noted that as the roller 11 rotates to bring one of the recesses 15 to a position adjacent the cleaning device 22, one of the rods 25 of the cleaning device is timed so that it just enters into the recess at a position closely adjacent a trailing one of the edges of the recess. As the recess moves forwardly in the clockwise direction around the axis of the shaft 12, the respective rod moves also forwardly in an anti-clockwise direction around the axis of the shaft 23 and also moves radially toward the axis of the shaft 22 thus moving into the recess to sweep the wall of the recess. These dimensions and numbers described above obtain the effect that, as the recess moves forwardly, the rod wipes around the semi-circular shape of the recess at a substantially constant clearance spacing from the surface of the recess. Thus FIG. 3 shows the initial step of the rod sweeping over the edge of its respective recess. FIG. 4 shows a further step advanced angularly of the step of FIG. 3 in which the rod has moved forwardly and more deeply into the recess while the next rod in the advancing direction is also wiping a part of the next adjacent recess. In FIG. 4 the rods are thus shown symmetrical about a line separating the two recesses which are concurrently being acted upon by those rods.

FIG. 5 shows a yet further advanced position in which it will be seen that the rod has reached the lower most point of the recess so that the rod lies on a line joining the axes of the shafts. From that position the rod moves forwardly relative to the recess and also outwardly relative to the recess to the position shown in FIG. 6 in which it sweeps over the forward most edge of the respective recess.

The clearance of the rod from the recess is chosen to be of the order of one sixteenth inch which is sufficient to enable the rod and recess to move relatively without danger of any damaging contact while ensuring sweeping action of the recess which is sufficient to remove all but an inner most layer of any particles which in any event cause no interference with the feeding of material and are swept out by further engagement with the material as the roller moves around.

Any material engaged in the recess by the respective rod is swept out of the recess and falls over the rod and over the edge of the recess into the cup 19 for collection in the venturi in the proper manner.

It will be appreciated therefore that the unique arrangement of the cleaning device which moves at a faster rate than the roller together with the dimensioning of the gears and the number of rods relative to the number of recesses causes this unique sweeping action of the rod moving with the recess while advancing relative to the recess and thus sweeping over the inner surface of the recess.

The fact that the gear wheel 28 of the cleaning device is slightly greater in dimension than one half of the gear wheel 29 of the roller accommodates the fact that the recesses do not lie immediately adjacent but are spaced by a portion of roller surface.

While the rods are shown are the preferred arrangement for causing the sweeping since these are resistant to wear and also allow any material which is swept to fall properly from the recess into the cup 19, other suitable members such as brush bristles can be used provided they obtain the necessary movement by engagement with the properly dimensioned shaft and gear interconnection.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for metering particulate material comprising an elongate roller having a central axis of symmetry, a first plurality of metering grooves formed in an outer peripheral surface of the roller, each groove extending longitudinally of the roller parallel to the roller axis and defining a substantially constant continuous cross-section along the roller which cross-section forms a smoothly curved cup-shaped surface recessed from said peripheral surface of the roller, said grooves being spaced angularly around said roller, means mounting the roller for rotation about said roller axis and adapted such that said particulate material in a container thereof can be engaged with said roller along the length of said grooves, drive means for rotating said roller at a desired speed such that each groove grasps and carries within its bounds a volume of said material, and means for cleaning said grooves of said roller as the roller rotates comprising a drive member rotatable about a longitudinal axis parallel to and spaced from the roller axis, a second plurality, equal to one half of the first plurality, of cleaning members carried by and projecting outwardly from said drive member in angularly spaced relation therearound, each of said cleaning members having a longitudinal extent not less than the length of the grooves, and synchronizing means for drivingly rotating the drive member at an angular velocity twice that of the roller, such that each groove as it rotates receives a cleaning member therein with the cleaning member rotating with the groove while the cleaning member moves relative to the groove to sweep around said curved surface of the groove, each of the cleaning members comprising an elongate straight rod parallel to the axis of the drive member and having an outer surface which is smoothly curved with a radius of curvature less than that of the surface of the grooves, means mounting the rod at a fixed radial spacing from the axis of the drive member such that each rod is held against radial movement as it moves past the groove, the rods being spaced to allow material to fall therebetween, the thickness of the rods being such that they are rigid and do not deform as they move past the grooves, the position of the drive member relative to the roller and the position of the outer surface of the rods relative to the drive member being arranged such that the outer surfaces of the rods are maintained at a substantially constant clearance from the curved surface of the groove to prevent contact therebetween.

* * * * *